United States Patent
Kondo et al.

(10) Patent No.: US 7,026,407 B2
(45) Date of Patent: Apr. 11, 2006

(54) PROCESS FOR PRODUCING MODIFIED POLYOLEFIN RESIN

(75) Inventors: Shinichi Kondo, Ichihara (JP); Takashi Sanada, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/865,897

(22) Filed: Jun. 14, 2004

(65) Prior Publication Data
US 2005/0080198 A1    Apr. 14, 2005

(30) Foreign Application Priority Data
Oct. 8, 2003  (JP)  ............................ 2003-349136

(51) Int. Cl.
*C08F 297/00* (2006.01)

(52) U.S. Cl. ...................... 525/273; 525/265; 525/240; 525/309; 525/328.2

(58) Field of Classification Search ............ 525/328.2, 525/309, 240, 273, 265
See application file for complete search history.

(56) References Cited

U.S. PATENT DOCUMENTS 3,519,593 A * 7/1970 Bolger ........................ 524/452
5,939,184 A   8/1999 Inoue et al.
6,569,950 B1 * 5/2003 Kitano et al. ................ 525/285

FOREIGN PATENT DOCUMENTS

JP  10-182892 A   7/1998
JP  2002-308947 A  10/2002

* cited by examiner

*Primary Examiner*—Ling-Sui Choi
(74) *Attorney, Agent, or Firm*—Sughrue Mion, PLLC

(57) ABSTRACT

There is provided a process for producing a modified polyolefin resin, which comprises the step of melt kneading at least the following components (A), (B) and (C):

(A) 100 parts by weight of a polyolefin resin,
(B) from 0.1 to 20 parts by weight of a compound containing an amino group and an unsaturated bond, and
(C) from 0.01 to 20 parts by weight of an organic peroxide.

1 Claim, No Drawings

PROCESS FOR PRODUCING MODIFIED POLYOLEFIN RESIN

FIELD OF THE INVENTION

The present invention relates to a process for producing a modified polyolefin resin.

BACKGROUND OF THE INVENTION

As a lightweight composite material comprising a combination of a polyolefin resin with an inorganic material, there is known a composite material comprising the polyolefin resin and a laminar clay mineral, which mineral is finely dispersed in the polyolefin resin (JP 10-182892A and U.S. Pat. No. 5,939,184).

SUMMARY OF THE INVENTION

However, an acid anhydride-modified polyolefin resin used as a compatibilizer for producing the above-mentioned composite material cannot compatibilize sufficiently the polyolefin resin with the laminar clay mineral, and therefore, it is difficult to disperse finely the laminar clay mineral in the polyolefin resin.

An object of the present invention is to provide a process for producing a modified polyolefin resin, which can disperse excellently the laminar clay mineral in the polyolefin resin. In the process according to the present invention, the polyolefin resin can be modified without an extreme decrease of a molecular weight of the polyolefin resin.

The present inventors have undertaken extensive studies to accomplish the above-mentioned object, and as a result, have found that the above-mentioned object can be accomplished using a modified polyolefin resin obtained by modifying a polyolefin resin with a specific compound, and thereby the present invention has been obtained.

The present invention is a process for producing a modified polyolefin resin, which comprises the step of melt kneading at least the following components (A), (B) and (C):

(A) 100 parts by weight of a polyolefin resin, (B) from 0.1 to 20 parts by weight of a compound containing an amino group and an unsaturated bond, and (C) from 0.01 to 20 parts by weight of an organic peroxide.

DETAILED DESCRIPTION OF THE INVENTION

Examples of the component (A) are an ethylene polymer resin, a propylene polymer resin and a butene polymer resin.

Examples of the above-mentioned ethylene polymer resin are an ethylene homopolymer resin, an ethylene-propylene copolymer resin, an ethylene-α-olefin copolymer resin, an ethylene-acrylic ester copolymer resin, an ethylene-methacrylic ester copolymer resin and an ethylene-vinyl acetate copolymer resin. Said α-olefin is preferably an α-olefin having from 4 to 20 carbon atoms, and examples thereof are 1-butene, 1-pentene, 1-hexene, 1-octene and 1-decene. Examples of said ethylene-α-olefin copolymer resin are an ethylene-1-butene copolymer resin, an ethylene-1-hexene copolymer resin and an ethylene-1-octene copolymer resin.

Examples of the above-mentioned propylene polymer resin are a propylene homopolymer resin; an ethylene-propylene random copolymer resin; a propylene-α-olefin random copolymer resin; an ethylene-propylene block copolymer resin, which comprises the first segment containing a propylene homopolymer part and the second segment containing an ethylene-propylene random copolymer part; and a propylene-α-olefin block copolymer resin, which comprises the first segment containing a propylene homopolymer part and the second segment containing a propylene-α-olefin random copolymer part. Each of said ethylene-propylene block copolymer resin and propylene-α-olefin block copolymer resin is not a block copolymer resin containing a chemical bond between the first segment and the second segment such as a conventional styrene-butadiene block copolymer represented by the formula - - - S-S-S - - - - B-B-B - - -, wherein S is a polymerized styrene unit; - - - S-S-S - - is the first segment containing the polymerized styrene units; B is a polymerized butadiene unit; and - - B-B-B - - - - is the second segment containing the polymerized butadiene units. However, persons skilled in the polyolefin art often call such a copolymer a block copolymer; namely, that is an idiomatic expression, because said copolymer is produced by the below-mentioned process comprising two steps.

The above-mentioned ethylene-propylene block copolymer resin or propylene-α-olefin block copolymer resin is produced by a process comprising the steps of:

(i) homopolymerizing propylene to produce the above-mentioned first segment, and (ii) random copolymerizing ethylene and propylene, or random copolymerizing propylene and an α-olefin in the presence of the first segment to produce the above-mentioned second segment, thereby obtaining the above-mentioned ethylene-propylene block copolymer resin or propylene-α-olefin block copolymer resin.

The α-olefin in the above-mentioned propylene-α-olefin random copolymer resin and propylene-α-olefin block copolymer resin is preferably an α-olefin having from 4 to 20 carbon atoms, and examples thereof are 1-butene, 1-pentene, 1-hexene, 1-octene and 1-decene.

An example of the above-mentioned propylene-α-olefin random copolymer resin is a propylene-1-butene random copolymer resin, and an example of the above-mentioned propylene-α-olefin block copolymer resin is a propylene-1-butene block copolymer resin.

Examples of the component (B) are a compound containing a primary, secondary or tertiary amino group and an unsaturated bond, and a quaternary compound obtained by reacting said compound with a reagent capable of converting said compound into the quaternary compound. Preferable and specific examples of the component (B) are diethylaminoethyl acrylate, diethylaminoethyl methacrylate, dimethylaminoethyl acrylate, dimethylaminoethyl methacrylate, methylethylaminoethyl acrylate and methylethylaminoethyl methacrylate, and quaternary compounds thereof.

The component (B) is used in an amount of from 0.1 to 20 parts by weight, and preferably from 0.5 to 10 parts by weight per 100 parts by weight of the component (A). When the amount is less than 0.1 part by weight, a graft amount of the component (B) onto the component (A) is low. When the amount is more than 20 parts by weight, the obtained modified polyolefin resin contains a large amount of the unreacted component (B), and therefore, the object of the present invention can hardly be accomplished.

The component (C) is preferably an organic peroxide having decomposition temperature of from 50 to 200° C., at which temperature a half-life thereof is 1 minute. When said decomposition temperature is lower than 50° C., a graft amount is low, and when said decomposition temperature is higher than 200° C., decomposition of the component (A) and/or the produced modified polyolefin resin is promoted. The component (C) preferably has a function of decomposing to generate a radical, which pulls a proton from the component (A) by a pull reaction.

Examples of the organic peroxide having decomposition temperature of from 50 to 200° C., at which temperature a half-life thereof is 1 minute, are a diacyl peroxide compound, a dialkyl peroxide compound, a peroxyketal compound, an alkyl perester compound and a percarbonate compound. Specific examples thereof are dicetyl peroxydicarbonate, di-3-methoxybutyl peroxydicarbonate, di-2-ethylhexyl peroxydicarbonate, bis(4-t-butylcyclohexyl) peroxydicarbonate, diisopropyl peroxydicarbonate, t-butyl peroxyisopropylcarbonate, dimyristyl peroxycarbonate, 1,1,3,3-tetramethylbutyl neodecanoate, α-cumyl peroxyneodecanoate, t-butyl peroxyneodecanoate, 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropyl monocarbonate, t-butylperoxy-3,5,5-trimethyl haxonoate, t-butylperoxylaurate, 2,5-dimethyl-2,5-di(bezoylperoxy)hexane, t-butylperoxyacetate, 2,2-bis(t-butylperoxy)butene, t-butylperoxybenzoate, n-butyl-4,4-bis(t-butylperoxy)valerate, di-t-butylperoxyisophthalate, dicumylperoxide, α-α'-bis(t-butylperoxy-m-isopropyl)benzene, 2,5-dimethyl-2,5-di(t-butylperoxy)hexane, 1,3-bis(t-butylperoxyisopropyl)benzene, t-butylcumylperoxide, di-t-butylperoxide, p-menthane hydroperoxide and 2,5-dimethyl-2,5-di(t-butylperoxy)hexyne-3. Among them, preferred is a dialkyl peroxide compound, a diacyl peroxide compound, a percarbonate compound or an alkylperester compound; particularly preferred is a dialkyl peroxide compound or a percarbonate compound; and most preferred is a combination of a dialkyl peroxide compound with a percarbonate compound such as a combination of 1,3-bis(t-butylperoxyisopropyl)benzene with dicetyl peroxydicarbonate.

The component (C) is used in an amount of from 0.01 to 20 parts by weight, and preferably from 0.05 to 10 parts by weight per 100 parts by weight of the component (A).

The component (A) may preferably be combined with a vinyl aromatic compound such as styrene and divinylbenzene as long as the object of the present invention is substantially accomplished. The vinyl aromatic compound is used in an amount of from 0 to 15 parts by weight, and preferably from 0 to 7 parts by weight per 100 parts by weight of the component (A). The component (A) may further be combined with an additive known in the art such as an antioxidant, a heat stabilizer and a neutralizer generally used in combination with a polypropylene-based resin.

A preferable process of the present invention comprises the steps of:

(1) mixing (or blending) all the starting components in a lump, or mixing (or blending) separately some combinations, each of which combinations contains said starting components, with a mixer (or blender), thereby obtaining a mixture or some mixtures (or blend(s)), and (2) melt kneading the obtained mixture(s) (or blend(s)) with a melt kneader.

Examples of the mixer (or blender) used in the above-mentioned step (1) are a Henschel mixer, a ribbon blender and a blender known in the art.

Examples of the melt kneader used in the above-mentioned step (2) are a Banbury mixer, a plastomil, a Brabender plastograph, a single-screw extruder and a twin-screw extruder known in the art.

A particularly preferable melt kneader used in the above-mentioned step (2) is a single-screw extruder or a twin-screw extruder in view of continuous production (namely, high productivity) of the modified polyolefin resin. Temperature in a melt kneading zone of the extruder (cylinder zone thereof) is from 50 to 300° C., and preferably from 80 to 280° C. When said temperature is lower than 50° C., a graft amount may be low, and when it is higher than 300° C., the component (A) and/or the produced modified polyolefin resin may be decomposed.

The above-mentioned step (2) is preferably carried out in two stages, wherein melt kneading temperature in the second stage is higher than that in the first stage; namely, when using an extruder as a melt kneader, it is preferable (i) to divide a melt kneading zone of the extruder into the first melt kneading zone and the second melt kneading zone, and (ii) to keep temperature in the second melt kneading zone higher than that in the first melt kneading zone. The temperature in the first melt kneading zone is from 80 to 200° C., and particularly preferably from 120 to 180° C., and the temperature in the second melt kneading zone is from 150 to 280° C., and particularly preferably from 200 to 270° C. A total melt kneading time is from 0.1 to 30 minutes, and particularly preferably from 0.5 to 15 minutes. When said time is shorter than 0.1 minute, a graft amount maybe insufficient, and when it is longer than 30 minutes, the component (A) and/or the produced modified polyolefin resin may be decomposed.

The modified polyolefin resin produced by the process in accordance with the present invention can be widely applied to a material for a molding such as an injection molding, an extrusion molding, a press molding, a blow molding and a film molding. Particularly, said modified polyolefin resin is so excellent in its stiffness that it can be applied to a material for a use such as an automobile and a home electric instrument. Further, said modified polyolefin resin is so excellent in its gas barrier property that it can be applied to a use such as various coating films and wrapping materials.

EXAMPLE

The present invention is explained with reference to the following Examples, which do not limit the scope of the present invention.

Example 1

To 100 parts by weight of an ethylene-propylene block copolymer resin (component (A-1)) having a melt index of 3 g/10 minutes measured according to JIS K7210 at 230° C. under a load of 21.2 N, and containing (i) the first segment of a propylene homopolymer in an amount of 86% by weight, and (ii) the second segment of an ethylene-propylene random copolymer in an amount of 14% by weight, wherein the total amount of the ethylene-propylene block copolymer resin was 100% by weight, there were added:

(1) 3.0 parts by weight of 2-diethylaminoethyl methacrylate (component (B-1)), (2) 0.50 part by weight of dicetyl peroxydicarbonate (component (C-1)) containing 2.8% of an active oxygen, and having decomposition temperature of 99° C., at which temperature a half thereof is 1 minute, (3) 0.15 part by weight of 1,3-bis(t-butylperoxyisopropyl) benzene (component (C-2)) containing 9.3% of an active oxygen, and having decomposition temperature of 183° C., at which temperature a half thereof is 1 minute, (4) 0.05 part by weight of calcium stearate, (5) 0.3 part by weight of tetrakis[methylene-3-(3,5-di-t-butyl-4-hydroxyphenyl) propionate]methane (antioxidant), and (6) 3.0 parts by weight of styrene monomer, and then, these components were mixed sufficiently, thereby obtaining a mixture.

The mixture was melt kneaded in a twin-screw extruder (L/D=25, and a cylinder diameter=20 mm) having a trade name of 2D25-S manufactured by Toyo Seiki Co., Ltd., wherein temperature of its first melt kneading zone was 180° C., and temperature of its second melt kneading zone was 260° C., and its screw rotating speed was 70 rpm, thereby obtaining a modified ethylene-propylene block copolymer resin.

Said modified copolymer resin had a melt index of 1.0 g/10 minutes measured according to the same method as that mentioned above. Comparison between said melt index (1.0 g/10 minutes) and the original melt index (0.3 g/10 minutes) of the component (A-1) came to the conclusion that a molecular weight of the component (A-1) was hardly lowered.

Said modified copolymer resin had a graft amount of 0.1% by weight, wherein the total amount of the modified copolymer resin was 100% by weight, measured by a method comprising the steps of:

(1) dissolving 1.0 g of the modified copolymer in 10 ml of xylene to obtain a solution, (2) dropping the solution into 300 ml of methanol under stirring to re-precipitate the modified copolymer, (3) separating the re-precipitated modified copolymer by filtration, (4) drying the separated modified copolymer in a vacuum drier at 80° C. for 8 hours, (5) hot-pressing the dried modified copolymer to obtain a film having 100 μm-thickness, (6) measuring an infrared absorption spectrum of the film, and (7) determining the graft amount from the absorption near 1730 $cm^{-1}$ of the spectrum.

Results are summarized in Table 1.

Example 2

Example 1 was repeated except that the component (B-1) was changed to 2-dimethylaminoethyl methacrylate (component (B-2)), thereby obtaining a modified copolymer resin having a melt index of 0.6 g/10 minutes and a graft amount of 0.1% by weight. Comparison between said melt index (0.6 g/10 minutes) and the original melt index (0.3 g/10 minutes) of the component (A-1) came to the conclusion that a molecular weight of the component (A-1) was hardly lowered. Results are summarized in Table 1.

Example 3

Example 1 was repeated except that the component (B-1) was changed to a quaternary compound of 2-dimethylaminoethyl methacrylate (component (B-3)) having a tradename of LIGHTESTER DQ-100 manufactured by Kyoeisha Chemical Co. Ltd, thereby obtaining a modified copolymer resin having a melt index of 0.3 g/10 minutes and a graft amount of 0.1% by weight. Comparison between said melt index (0.3 g/10 minutes) and the original melt index (0.3 g/10 minutes) of the component (A-1) came to the conclusion that a molecular weight of the component (A-1) was not lowered. Results are summarized in Table 1.

Example 4

Example 2 was repeated except that the component (A-1) was changed to a propylene homopolymer (component (A-2)) having a melt index of 0.5 g/10 minutes, thereby obtaining a modified polymer resin having a melt index of 2.6 g/10 minutes and a graft amount of 0.1% by weight. Comparison between said melt index (2.6g/10 minutes) and the original melt index (0.5g/10 minutes) of the component (A-2) came to the conclusion that a molecular weight of the component (A-2) was hardly lowered.

To 95 parts by weight of said modified polymer resin, there was added 5 parts by weight of a mixture of magnesium sodium fluoride silicate with polyoxypropylenemethyldiethyl ammonium ion, which mixture has a trade name of SOMASIF MPE manufacture by CO-OP Chemical Co. Ltd., thereby obtaining a mixture. Said mixture was kneaded in a labo-plastomil manufactured by Toyo Seiki Co., Ltd. at 200° C. at a rotating speed of 80 rpm to obtain a kneaded product. Said kneaded product had such a large interlaminar distance as 30 Å measured according to an X-ray diffraction measurement, which showed excellent dispersion of SOMASIF MPE in the modified polymer. Results are summarized in Table 1.

Comparative Example 1

To 100 parts by weight of the component (A-2) used in Example 4, there were added (1) 0.5 part by weight of maleic anhydride, (2) 0.04 part by weight of the component (C-2) used in Example 1, (3) 0.05 part by weight of calcium stearate, and (4) 0.3 part by weight of tetrakis[methylene-3-(3,5-di-t-butyl-4-hydroxyphenyl) propionate]methane (antioxidant), and then, these components were mixed sufficiently, thereby obtaining a mixture.

Said mixture was melt kneaded according to the same method as that in Example 1, thereby obtaining a modified polymer having a melt index of 40 g/10 minutes and a maleic anhydride-graft amount of 0.1% by weight. Comparison between said melt index (40 g/10 minutes) and the original melt index (0.5 g/10 minutes) of the component (A-2) came to the conclusion that a molecular weight of the component (A-2) was lowered extremely.

To 95 parts by weight of said modified polymer, there was added 5 parts by weight of the above-mentioned SOMASIF MPE, thereby obtaining a mixture. Said mixture was kneaded according to the same method as that in Example 4 to obtain a kneaded product. Said kneaded product had such a small interlaminar distance as 27 Å, which showed poorer dispersion of SOMASIF MPE than that in Example 4. Results are summarized in Table 1.

Comparative Example 2

To 95 parts by weight of the component (A-2) used in Example 4, there was added 5 parts by weight of the above-mentioned SOMASIF MPE, thereby obtaining a mixture. Said mixture was kneaded according to the same method as that in Example 4 to obtain a kneaded product. Said kneaded product had such a small interlaminar distance as 26 Å, which showed poor dispersion of SOMASIF MPE in the component (A-2). Results are summarized in Table 1.

TABLE 1

|  | Example | | | | Comparative Example | |
|---|---|---|---|---|---|---|
|  | 1 | 2 | 3 | 4 | 1 | 2 |
| Component (A) | | | | | | |
| A-1 | 100 | 100 | 100 | | | |
| A-2 | | | | 100 | 100 | 100 |
| Component (B) | | | | | | |
| B-1 | 3.0 | | | | | |
| B-2 | | 3.0 | | 3.0 | | |
| B-3 | | | 3.0 | | | |
| Component (C) | | | | | | |
| C-1 | 0.50 | 0.50 | 0.50 | 0.50 | | |
| C-2 | 0.15 | 0.15 | 0.15 | 0.15 | 0.04 | |
| Other component | | | | | | |
| Maleic anhydride | | | | | 0.5 | |
| Calcium stearate | 0.05 | 0.05 | 0.05 | 0.05 | 0.05 | |
| Antioxidant (Note) | 0.3 | 0.3 | 0.3 | 0.3 | 0.3 | |
| Styrene monomer | 3.0 | 3.0 | 3.0 | 3.0 | | |
| Evaluation | | | | | | |
| Melt index (g/10 min.) | 1.0 | 0.6 | 0.3 | 2.6 | 40 | |
| Graft amount (wt %) | 0.1 | 0.1 | 0.1 | 0.1 | 0.1 | 0 |
| Interlaminar distance (Å) | | | | 30 | 27 | 26 |

Note
The antioxidant was tetrakis[methylene-3-(3,5-di-t-butyl-4-hydroxyphenyl)propionate]methane.

The invention claimed is:

1. A process for producing a modified polyolefin resin, which comprises the step of melt kneading at least the following components (A), (B), (C), and (D):
    (A) 100 parts by weight of a polyolefin resin,
    (B) from 0.1 to 20 parts by weight of a compound containing an amino group and an unsaturated bond,
    (C) from 0.01 to 20 parts by weight of an organic peroxide, and
    (D) a vinyl aromatic compound;
    wherein the melt kneading is carried out in an extruder in two stages, the melt kneading temperature in the second stage being higher than that in the first stage, and the component (C) is a combination of a dialkyl peroxide compound with a percarbonate compound.

* * * * *